350-267 SR

12/2/80 XR 4,236,360

United States Patent [19]

Parrier et al.

[11] 4,236,360

[45] Dec. 2, 1980

[54] MULTIPLE-PANE WINDOW COMPRISING A FLUID FILTER CURTAIN

[76] Inventors: Andre' Parrier; Jean Parrier; Henri Parrier, all of 41, rue Marius Poncet, 69390 Saint-Genis-les-Ollieres, France

[21] Appl. No.: 934,508

[22] Filed: Aug. 17, 1978

[30] Foreign Application Priority Data

Aug. 26, 1977 [FR] France ............................ 77 26774

[51] Int. Cl.[3] ........................ G02B 5/24; E06B 7/12

[52] U.S. Cl. ................................ 52/171; 350/267; 350/312

[58] Field of Search ................ 52/171; 350/258, 259, 350/260, 312, 179

[56] References Cited

U.S. PATENT DOCUMENTS

| | | | |
|---|---|---|---|
| 192,843 | 7/1877 | Sloan | 350/312 |
| 2,332,060 | 10/1943 | Colleran | 350/312 |
| 3,695,681 | 10/1972 | Dockery | 52/171 |
| 3,724,929 | 4/1973 | Lacy | 350/212 |
| 3,761,165 | 9/1973 | Bernard | 350/312 |
| 4,044,519 | 8/1977 | Morin et al. | 350/312 |
| 4,081,934 | 4/1978 | Franz | 52/171 |

*Primary Examiner*—William F. Pate, III
*Attorney, Agent, or Firm*—Sidney W. Millard

[57] ABSTRACT

The window panes delimit a leak-tight air chamber and a narrow leak-tight space which can be filled with immiscible liquids having different optical indices supplied from a bottom reservoir and a top reservoir housed within the window frame. The top reservoir has decompression vents and the bottom reservoir is connected to a pump for injecting one of the fluids through a distribution chamber into the leak-tight space. The window serves to ensure heat insulation, to store and redistribute heat and to provide shielding against radioactive radiation.

10 Claims, 10 Drawing Figures

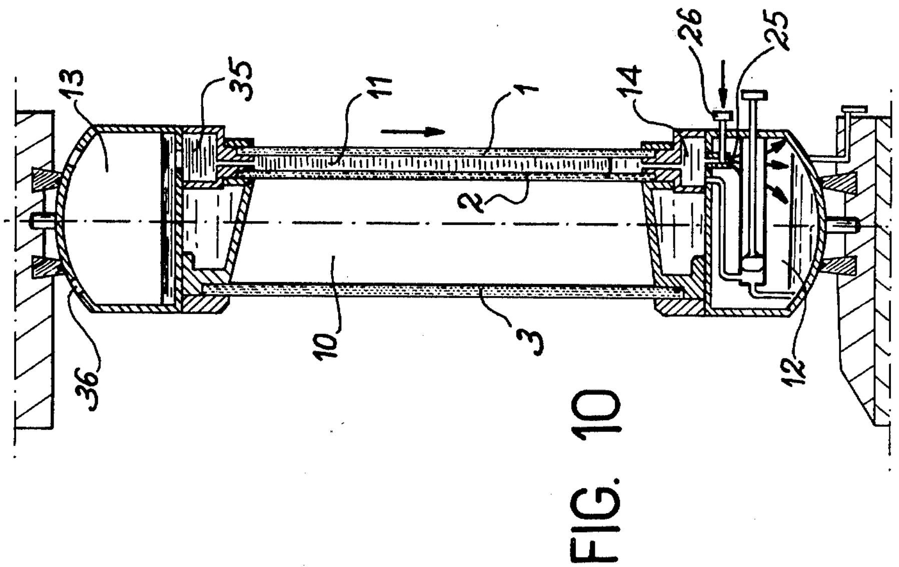
FIG. 10
FIG. 9
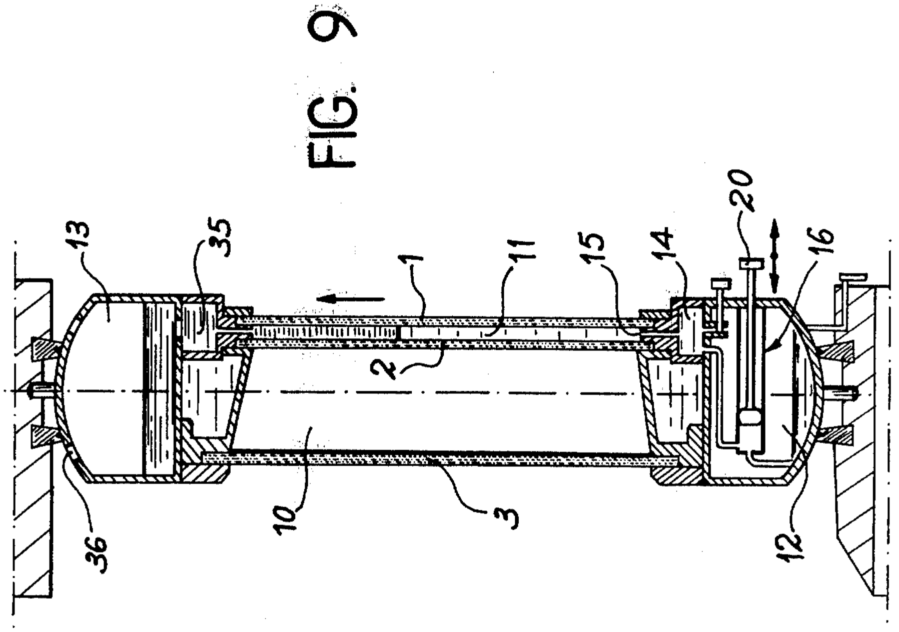

MULTIPLE-PANE WINDOW COMPRISING A FLUID FILTER CURTAIN

This invention relates to a multiple-pane window having a fluid filter curtain.

It is known that fluid filter curtain windows within which liquid filtering substances can be more or less completely enclosed between two parallel window panes make it possible to achieve savings in power consumption costs both in summer and in winter. In summer, the saving of power applies to an air-conditioning installation if the liquid curtain chosen is opaque to infrared radiation: the infrared rays emanating from the exterior no longer penetrate the premises subjected to a cooling process. During the winter, the saving of power applies to the heating of the enclosure if the liquid curtain chosen is transparent to near infrared radiation or if the liquid curtain is simply dispensed with: the infrared rays thus cooperate in heating the premises. In both cases, these windows have the further effect of preventing heat losses which would be liable to take place by convection since multiple window panes form a good heat insulation.

The aim of the invention is to provide a window of this type in an improved form in order to ensure simple and effective operation.

A further aim of the invention is to provide a window of this type which has a more attractive appearance in order to ensure that, if it is desired to withdraw the liquid filter curtain to only a partial extent, the boundary line between the opaque liquid curtain and a transparent liquid curtain between the two parallel window panes is perfectly horizontal.

Yet another aim of the invention is to provide a window of this type which is also capable of storing a certain quantity of heat derived from the sun's rays during the daytime in order to use this heat during the night.

In accordance with an additional feature of the invention, the top fluid reservoir communicates with the leak-tight space by means of a distribution chamber which extends longitudinally over the entire length of the top edge of the leak-tight space and which communicates with said space through a series of ducts disposed at uniform intervals along the top edge of the leak-tight space.

In accordance with a further distinctive feature of the invention, the edges of the two parallel window panes which delimit the leak-tight space between them are clamped between two metallic packing-pieces which are applied on the one hand against the respective external faces of said window panes and on the other hand on each side of an internal lip of the frame.

In accordance with another distinctive feature of the invention, the internal lip of the frame has a thick portion adjacent to the metallic packing-pieces and a thin portion extending between the two window panes which delimit the leak-tight space between them. The ducts provide a communication between the leak-tight space and the corresponding distribution chambers being intended to open into the leak-tight space along the free edge of the thin portion of the internal lip. Peripheral seals are clamped on the one hand between the window panes and the metallic packing-pieces and on the other hand between the panes and the thin portion of the internal lip. The metallic packing-pieces and the internal lip are provided with longitudinal recesses within which the seals are intended to fit to a partial extent.

In accordance with still another distinctive feature of the invention, the window comprises a peripheral heat storage chamber which is capable of containing a suitable liquid, said heat storage chamber being delimited on the side nearest the center of the window by walls forming a leak-tight chamber between one of the parallel window panes which delimit the leak-tight space and an additional pane which is parallel to the other two panes, the leak-tight chamber being of much greater thickness than the leak-tight space.

In accordance with again another distinctive feature of the invention, the additional window pane is located on the side nearest the exterior of the premises and the walls which separate the leak-tight chamber from the peripheral heat storage chamber are inclined so that the leak-tight chamber as a whole is flared-out towards the exterior of the premises.

A better understanding of the distinctive features of the invention will be obtained from the accompanying drawings which are given by way of example and not in any limiting sense and in which:

FIGS. 8 to 10 are views which are identical with that of FIG. 2 but illustrate the different stages of operation of the window in accordance with the invention.

Figure 1:
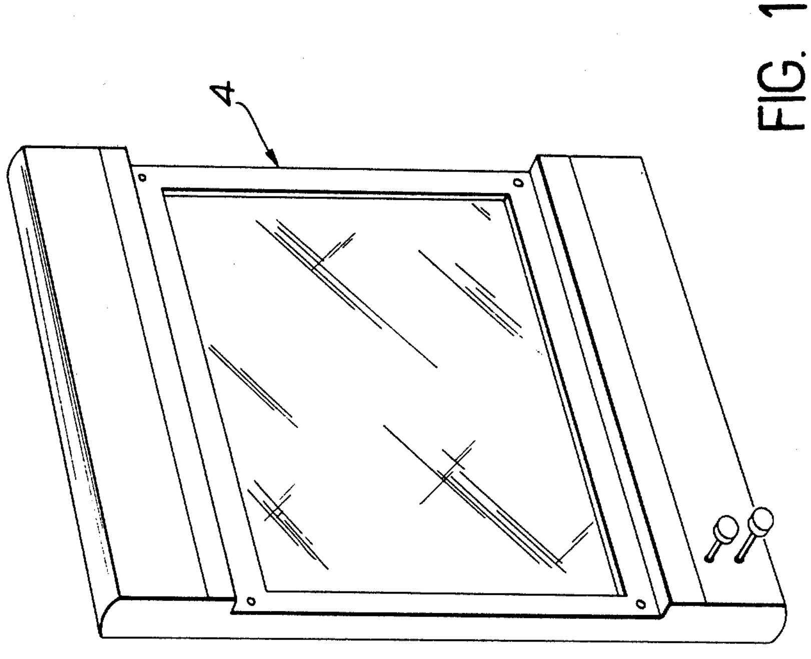
FIG. 1 is a general view in perspective showing a window in accordance with the invention.

There is shown in FIG. 1 a window in accordance with the invention, looking from the interior of the premises in which the window is installed. Looking from the interior to the exterior of the premises, said window is provided with three panes 1, 2 and 3 maintained within a peripheral frame 4 constituted by two vertical uprights and two horizontal cross-members. The assembly thus formed is completely independent and can be mounted, for example, at the center of a fixed window casing 5 (FIG. 2) by means of pivots 6 and 7 which permit pivotal displacement of the window about a vertical axis 8. A latch 9 serves to lock the window in the closed position.

The window panes 2 and 3 delimit between them a leak-tight chamber 10 filled with air whilst the panes 1 and 2 delimit between them a leak-tight space which is much narrower than the leak-tight chamber 10 and can be filled with liquids supplied from a bottom reservoir 12 and from a top reservoir 13. These reservoirs extend within the thickness of the frame 4.

Figure 3:
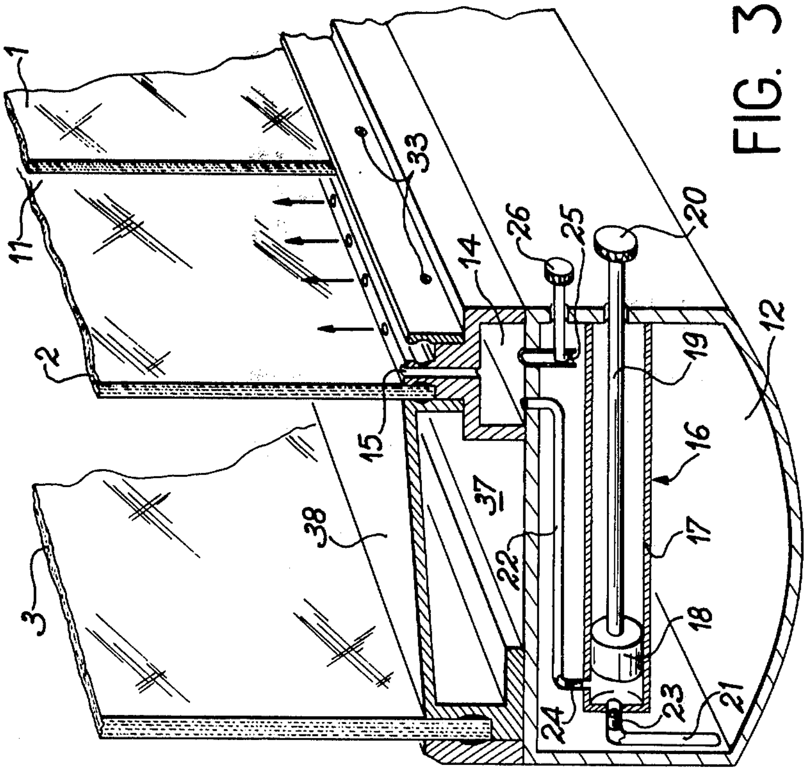
FIG. 3 is a fragmentary view of said window to a larger scale, this view being taken in perspective and in cross-section along a transverse vertical plane.

As can be seen more especially from the detailed view of FIG. 3, the bottom reservoir 12 is associated with a distribution chamber 14 which extends longitudinally over the entire length of the bottom edge of the leak-tight space 11 and which communicates with said leak-tight space through a series of vertical ducts 15 disposed at uniform intervals along the bottom edge of the leak-tight space. The window is equipped with a lift and force or hand pump 16 which is placed within the interior of the bottom reservoir 12. Said pump comprises a horizontal cylinder 17 within which is slidably mounted a piston 18 and a piston rod 19 which passes through the reservoir wall and projects outside this latter to a slight extent. The free end of said rod carries an operating knob 20 which is visibly located on the inside of the window. The end of the cylinder 17 is connected on the one hand to the bottom of the reservoir 12 by means of a first pipe 21 and on the other hand to the distribution chamber 14 by means of a second pipe 22. Check-valves 23 and 24 are fitted respectively in the pipes 21 and 22 in order to ensure that the liquid which is present within the reservoir 12 is permitted to flow only from this latter towards the distribution chamber 14. Said distribution chamber 14 also communicates with the reservoir 12 through a discharge valve 25 which is actuated by means of an operating knob 26 located next to the knob 20.

Figure 5:
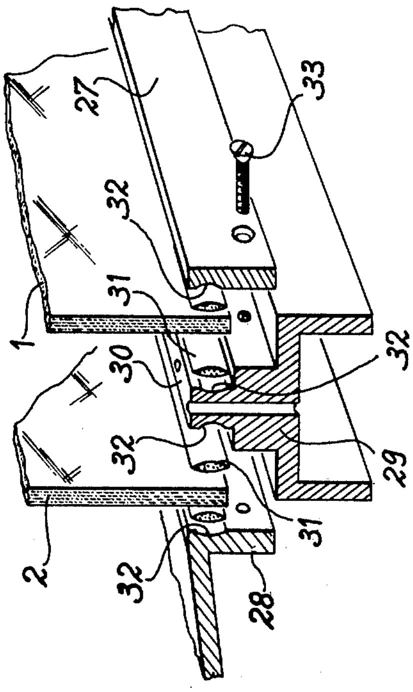
FIG. 5 is an exploded view in perspective corresponding to FIG. 4.
Figure 4:
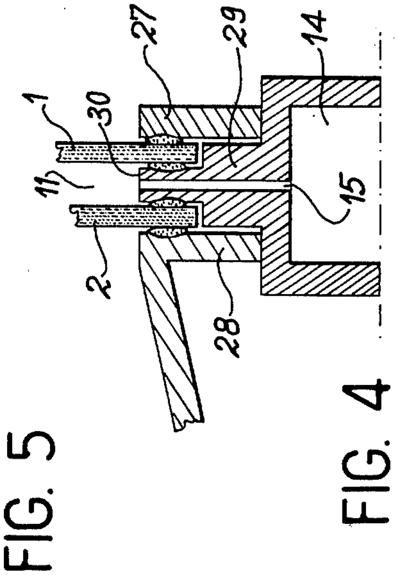
FIG. 4 is an enlarged portion of FIG. 2.
Figure 7:
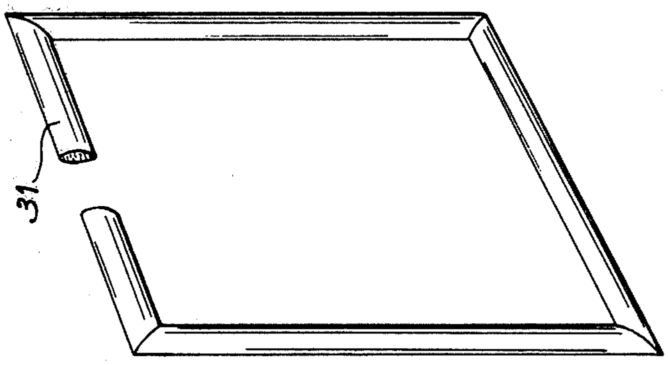
FIG. 7 is a view of said seal in perspective.
Figure 6:
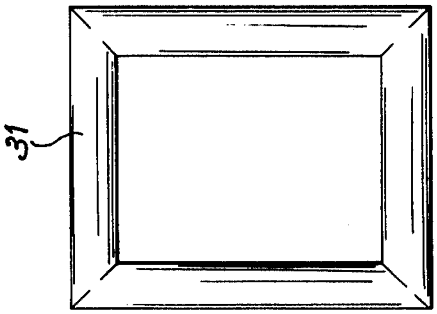
FIG. 6 is a front view of a seal.

Referring now to FIGS. 4 and 5, it is apparent that the edges of the two window panes 1 and 2 are clamped between two metallic packing-pieces 27 and 28 which are applied on the one hand against the respective external faces of said panes and on the other hand on each side of the thick portion 29 of an internal lip of the frame. Said internal lip also has a thin portion 30 which extends between the two panes 1 and 2 and the ducts 15 open into the leak-tight space 11 along the free edge of the thin portion 30 of the internal lip. Peripheral seals 31 which are similar to the seal shown in FIGS. 6 and 7 are clamped on the one hand between the panes 1 and 2 and the metallic packing-pieces 27 and 28 and on the other hand between the panes 1 and 2 and the thin portion 30 of the internal lip. The metallic packing-pieces and the internal lip are provided with longitudinal recesses 32 within which the seals 31 are intended to fit at least to a partial extent. The metallic packing-pieces 27 and 28 are fixed in position by means of screws 33 (as shown in FIGS. 3 and 5).

Figure 2:
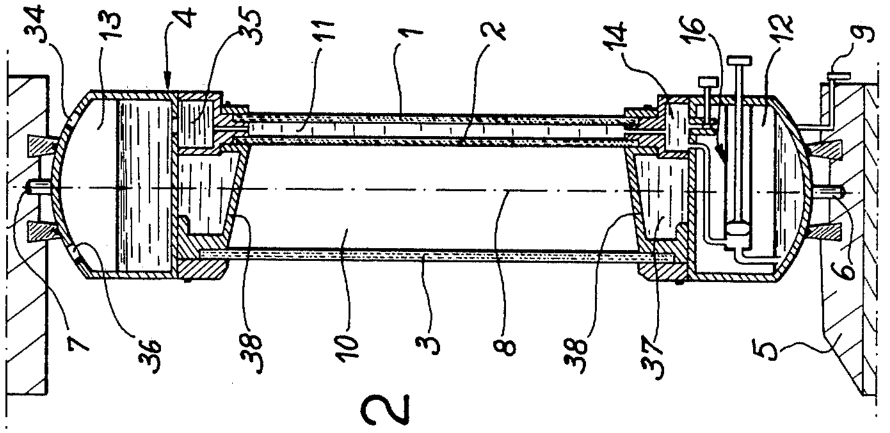
FIG. 2 is a sectional view of said window taken along a transverse vertical plane.

As shown in FIG. 2, the top reservoir 13 is provided with a filler opening 34 and is in turn assisted by a distribution chamber 35 which extends longitudinally along the top edge of the leak-tight space 11 and which communicates with said space through a series of vertical ducts uniformly distributed along the top edge of the leak-tight space 11. The reservoir 13 is provided at the top with decompression vents 36 which are open to the external atmosphere.

The reservoirs 12 and 13 contain two different and immiscible liquids, the liquid of the reservoir 13 being of lower density. One of these two liquids such as the liquid of the top reservoir 13, for example, is either colored or opaque in order to filter the sun's rays or in order to stop them completely. By way of alternative, only the bottom reservoir 12 contains a liquid whereas the top reservoir 13 contains only air.

The liquids or the fluids placed within the reservoirs 12 and 13 can be of any desired nature but the liquid or the fluid of the bottom reservoir 12 is usually translucent.

By way of example, the bottom liquid can consist of trichloroethane. The top liquid can consist of colored glycerin. Depending on the wavelengths to be absorbed, it should be ensured that the dyes employed should have suitable colors, that they do not stain the glass and can also be readily incorporated in the glycerin. Generally speaking, the yellow dyes absorb in the ultraviolet region and the blue dyes absorb in the infrared region.

Finally, the frame 4 contains a peripheral heat-storage chamber 37 which is capable of containing a suitable liquid such as oil, for example (FIG. 3). The storage chamber 37 extends around the entire periphery of the leak-tight chamber 10 and the walls 38 which separate these two chambers are inclined in such a manner as to ensure that the leak-tight chamber 10 is generally flared-out towards the window pane 3. Depending on requirements, these walls 38 can be provided either with a reflecting coating or with a coating which is capable of absorbing radiations with a view to heating the liquid contained in the chamber 37.

Figure 8:
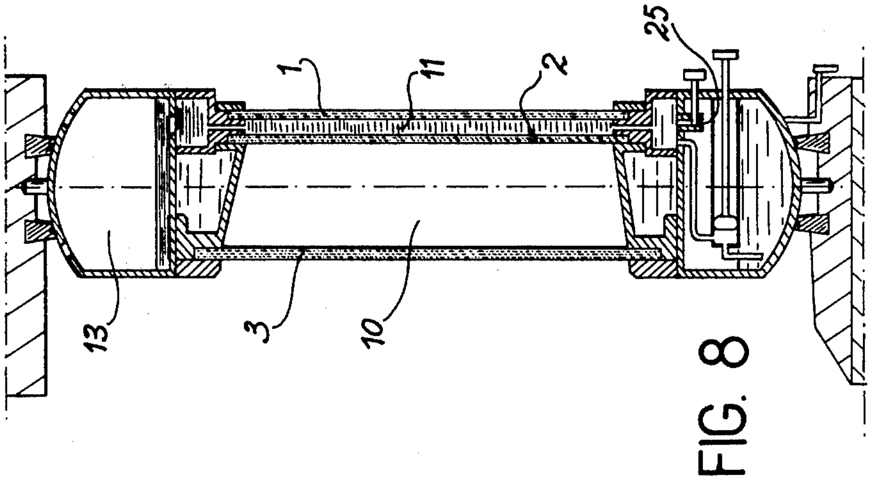

The operation of the window takes place as follows:

In the case of FIG. 8, the leak-tight space 11 formed between the window panes 1 and 2 is filled with a liquid curtain supplied from the top reservoir 13. Since the liquid under consideration is opaque, the sun's rays are more or less completely stopped. The discharge valve 25 normally remains closed.

When the operating knob 20 of the pump 16 is actuated as illustrated in FIG. 9, the liquid of the bottom reservoir 12 is injected into the distribution chamber 14. This liquid then penetrates into the leak-tight space 11 through all the vertical ducts 15 at the same time and acts as a piston within the leak-tight space 11 in order to drive the opaque liquid in the upward direction. Said liquid penetrates into the distribution chamber 35, then into the top reservoir 13. At the same time, the air contained in the reservoir 13 is permitted to escape through the vents 36. By virtue of the presence of the distribution chamber 14 provided with ducts 15, the boundary line between the two liquids remains completely horizontal, which would not be the case if the liquid derived from the reservoir 12 were injected from a single opening at the bottom of the leak-tight space 11. The curtain of opaque liquid is found to be fully raised when the space 11 is completely filled with translucent or colorless liquid derived from the bottom reservoir 12.

In order to lower the opaque liquid curtain, the knob 26 of the valve 25 is actuated (FIG. 10). The liquid derived from the reservoir 12 which has previously been injected into the leak-tight space 11 returns directly into the bottom reservoir 12 under the action of gravity. At the same time, atmospheric air is again permitted to enter the top reservoir 13 through the vents 36. During this operation, the distribution chamber 35 and its series of vertical ducts perform the same function as the distribution chamber 14 and the ducts 15.

It will be noted that the method adopted for mounting the window panes 1 and 2 is particularly advantageous by reason of the fact that these panes are securely maintained one against the other by means of the metallic packing-pieces 27 and 28, especially along the bottom edge of the leak-tight space 11, namely in that zone in which the pressure exerted by the liquids on the panes has the highest value.

Moreover, when the walls 38 are provided with a coating which absorbs the rays, the sun heats the liquid contained in the chamber 37 throughout the day. During the night, said liquid gives up the heat which it has absorbed. Thus the evolution of heat produced compensates for the small heat losses which would be liable to take place at the level of the window by convection between the ambient air of the premises and the external atmospheric air.

In accordance with another alternative embodiment, at least one of the fluids consists of mercury. In this case, the opaque curtain which can be formed by mercury within the leak-tight space 11 also has the property of stopping the radiations emitted by radioactive substances. A safety window can thus be provided for laboratory use and the leak-tight space 11 which is normally occupied by a colorless liquid can rapidly be filled with a mercury curtain in order to guard against the danger of exposure to radiation. Operators can thus perform remote manipulation of hazardous products located on the other side of the window.

It is readily apparent that the window pane 3 is not necessary in the most simple embodiment of the invention but clearly becomes essential when it is desired to recover heat energy.

We claim:

1. A window comprising a rectangular frame constituted by two vertical uprights and two horizontal cross-members consisting respectively of a top cross-member and a bottom cross-member and at least two flat, smooth and parallel window panes secured to said frame along their edges, said frame and said two window panes being so arranged as to define a leak-tight space, and further comprising:

a bottom reservoir housed within said bottom cross-member and adapted to receive a first fluid, a first distribution chamber housed within said bottom cross-member and adapted to extend along the entire length of those edges of the window panes which are in contact with the bottom cross-member, said first distribution chamber being adapted to communicate with said leak-tight space through a plurality of ducts disposed in uniformly spaced relation along the entire length, a lift and force pump associated with control means and having an inlet which opens into said bottom reservoir and an outlet which opens into said first distribution chamber, said pump being placed within said bottom cross-member, a controllable discharge valve placed within said bottom cross-member and capable of establishing a communication between said bottom reservoir and said first distribution chamber, a top reservoir housed within said top cross-member and provided with means for establishing a communication with that portion of said leak-tight space which is located in the vicinity of said top cross-member and capable of receiving a second fluid, the density of the first fluid being higher than that of the second fluid, the two fluids being such as to have different optical indices, each cross-member and each upright is provided on the internal face directed towards the window panes with a lip, said lip having a thick portion in the vicinity of the upright or of the cross-member and a portion of reduced thickness extending between said window panes, the edge of each of the two window panes being clamped between one face of said portion of reduced thickness and an external packing-piece, said two packing-pieces being each secured by clamping against one of the two faces of the upright or of the cross-member which is parallel to said window panes, the ducts extending through said lip and seals and being interposed between the faces of the portion of reduced thickness and the window panes and between the packing-pieces and said panes.

2. A window according to claim 1, wherein said means for establishing a communication between the top reservoir and said leak-tight space consist of a second distribution chamber housed within said top cross-member and adapted to extend along the entire length of the window panes in contact with the top cross-member, said second distribution chamber being adapted to communicate with said leak-tight space through a plurality of ducts disposed in uniformly spaced relation along the entire length.

3. A window according to claim 1 comprising a third window pane, means for leak-tight fixing of said third window pane on the cross-members and the uprights of said frame in such a manner as to ensure that said third pane is parallel to the two other panes aforesaid, said third pane being such as to define with one of the two first panes a leak-tight chamber of greater thickness than said leak-tight space, and a heat storage chamber formed within said uprights and cross-members, said heat storage chamber being separated from said leak-tight chamber by partition-walls which form part of said frame, said heat storage chamber being capable of containing a heat recovery liquid.

4. A window according to claim 3, wherein said partition-walls are inclined with respect to the third window pane so as to form acute dihedral angles between said third pane and each partition-wall aforesaid.

5. A window according to claim 1 wherein the rectangular frame is mounted in a window casing, said frame being movable with respect to said casing.

6. A window according to claim 2 wherein the rectangular frame is mounted in a window casing, said frame being movable with respect to said casing.

7. A window according to claim 3 wherein the rectangular frame is mounted in a window casing, said frame being movable with respect to said casing.

8. A window according to claim 4 wherein the rectangular frame is mounted in a window casing, said frame being movable with respect to said casing.

9. A window according to claim 1 with said frame being movable relative to said casing.

10. A window according to claim 9, wherein said means for establishing a communication between the top reservoir and said leak-tight space consist of a second distribution chamber housed within said top cross-member and adapted to extend along the entire length of the window panes in contact with the top cross-member, said second distribution chamber being adapted to communicate with said leak-tight space through a plurality of ducts disposed in uniformly spaced relation along the entire length.

* * * * *